United States Patent [19]
Shea et al.

[11] Patent Number: 5,809,061
[45] Date of Patent: Sep. 15, 1998

[54] CDMA COMMUNICATION SYSTEM WITH PILOT TONE CONTROL

[75] Inventors: James E. Shea, Ellicott City; Royce G. Bunce, Edgewater, both of Md.

[73] Assignee: Sigtek, Inc., Columbia, Md.

[21] Appl. No.: 514,812

[22] Filed: Aug. 14, 1995

[51] Int. Cl.⁶ .......................... H04B 1/69; H04B 1/707; H04J 13/00; H04J 13/04
[52] U.S. Cl. .......................... 375/206; 370/342
[58] Field of Search .................. 375/200, 206, 375/201; 370/342, 335, 320; 455/561, 550, 504

[56] References Cited

U.S. PATENT DOCUMENTS

| | | | |
|---|---|---|---|
| 5,056,109 | 10/1991 | Gilhousen et al. | 370/342 |
| 5,093,840 | 3/1992 | Schilling | 375/200 |
| 5,103,459 | 4/1992 | Gilhousen et al. | 370/207 |
| 5,235,615 | 8/1993 | Omura | 370/342 |
| 5,257,283 | 10/1993 | Gilhousen et al. | 375/200 |
| 5,265,119 | 11/1993 | Gilhousen et al. | 370/335 |
| 5,267,262 | 11/1993 | Wheatley, III | 375/200 |
| 5,299,226 | 3/1994 | Schilling | 375/200 |
| 5,396,516 | 3/1995 | Padovani et al. | 375/225 |

Primary Examiner—Chi H. Pham
Assistant Examiner—William Luther
Attorney, Agent, or Firm—Rossi & Associates

[57] ABSTRACT

A method and apparatus for the control of each mobile station within a Code Division Multiple Access (CDMA) communications network using simple pilot tones generated and controlled by a base station is described that is intended for use with full duplex, point to multipoint communications networks, particularly low mobility, cellular configurations. A pilot tone signal is added to a voice channel transmitted from a base station to a mobile station. The voice and pilot tone signals are further modulated using direct sequence spread spectrum (DSSS) techniques. The pilot tone serves several purposes. It allows the receive hardware to recover a frequency reference based on the DSSS code rate, which is used to synthesize the receiver tuning, generate the DSSS decoding sequence and synchronously demodulate the voice channel at the mobile station. The amplitude of the forward channel pilot tone is used to control the return channel transmit level. The invention implements a combined open and closed loop mechanism. The pilot tone is always present during voice activity detection and allows immediate activation of the voice channel with proper tuning and power level.

10 Claims, 3 Drawing Sheets

CDMA COMMUNICATION SYSTEM WITH PILOT TONE CONTROL

FIELD OF THE INVENTION

The invention relates in general to spread spectrum communications in a cellular communications environment. More specifically, the invention provides a method and apparatus for adaptive power control and synchronization of numerous mobile station sites.

BACKGROUND

Code division multiple access (CDMA) multiplexing relies on direct sequence spread spectrum (DSSS) techniques. Specifically, a spread spectrum signal is generated by modulating an information signal by a noise like signal of a known pattern. The spread spectrum signal has a bandwidth well in excess of the bandwidth required to handle the information signal. Multiple information signals may then be conveyed through the shared bandwidth by modulating these signals by other noise like codes with properties of minimum cross correlation.

A typical CDMA transmission from a base station involves modulation of the information signal. In most cases, the modulation is applied to a carrier signal as a form of phase modulation. A divided frequency from a precise oscillator, for example, can be used as a reference source. The base station transmitter then spreads this signal using a spreading code, which is preferably generated at a rate determined by the same reference oscillator. Finally, the spread spectrum signal is up converted to an RF frequency for transmission.

The first step in the receiving process is the accurate tuning of the incoming signal. When the reference frequency used at the base station transmitter is derived from the DSSS coding rate, exact local oscillators can be generated to tune the incoming signal with very small error. Local oscillators are simply generated from the derived reference exactly as they are generated at the transmitter. This reciprocal tuning process should return a replica of the IF signal used in the transmitter with noise and co-channel interference added.

A DSSS demodulator operates by multiplying the incoming signal by the original spreading code to maximally correlate only that signal. The code must not only match that used at the transmit side, it must also share the same rate and the proper phase. If these conditions are met, the modulated information signal is returned at the original bandwidth, which is much less than the spread signal. There are other cochannel signals and noise added by the communications link. The decoding sequence has little effect on any added noise and the noise remains at its original wide bandwidth. The decoding sequence has a beneficial effect on narrow band interferors. The decoding spreads the narrow interferer over the codes wide bandwidth. The effect of the decoding on the other cochannel signals present is to reduce their amplitude as the cross correlation between the codes and information modulation of the signal of interest and the cochannel signals. Additionally, the decoding process leaves these signals at the bandwidth of the original spread signal. If narrow band filtering is applied to this combination of signals, interference and noise, further advantage is gained. The combination of code decorrelation and filtering gain allow the multiple users to share the common communications link.

Once the incoming signal has been despread and filtered, the underlying modulated information signal is revealed. The modulated information signal must then be demodulated to recover the information content. In all cases, demodulation performance is improved if the original carrier is available, which allows coherent demodulation. When a base station reference frequency is extracted from the DSSS coding, the original carrier frequency used to modulate the information is available. This carrier is simply generated from the derived reference by dividing exactly as in the transmitter. The reference carrier allows exact measurement of phase after resolving an initial phase offset, which allows the absolute determination of phase required for coherent demodulation.

There are several aspects of the DSSS demodulation process that require special consideration. The despreading code, for example, must be in phase with the code originally used to spread the signal. If the despreading code is not in phase with the original spreading code, the demodulating code will slip a bit and the codes will begin to decorrelate. Further, the codes have many possible phases and can require very long intervals for code phase acquisition. Finally, the ability to support multiple users is dependent not only on code decorrelation and filtering gain, but on the receive level of each signal. A cochannel interferer received at the base station at a higher power than others places an unnecessarily high self interference load on all other channels. Optimum performance is achieved when all incoming signals are received at the base station at the same level, which requires some form of power control. Mobile stations could be calibrated to fixed transmit levels to insure identical receive levels at the base station. Imperfect component stability and a rapidly varying communications link, however, make this solution impractical.

In view of the above, it is an object of the invention to increase the responsiveness and density of mobile stations in a multiple user network.

Another object of the invention is to provide a method and apparatus to rapidly and accurately control the transmit power of mobile stations in the presence of fading and thereby increase the user density in the network.

A further object of the invention is to allow adaptive control of the precise transmit power of mobile stations and thereby increase the user density in the network.

Another object of the invention is to allow precise control of the tuning frequency at the mobile station allowing rapid acquisition of a working channel whenever voice activity begins.

Another object of the invention is to allow precise control of the DSSS code rate at the mobile station allowing rapid acquisition of a working channel whenever voice activity begins.

A further object of the invention is to allow precise control of the DSSS code rate at the mobile station allowing extended preservation of DSSS code synchronization allowing rapid acquisition of a working channel whenever voice activity begins.

A still further object of the invention is to allow synchronous demodulation of a working channel to provide high voice channel quality.

SUMMARY OF THE INVENTION

The above objects and others are achieved by a method and apparatus for controlling each mobile station within a CDMA communications network that utilizes a simple pilot tone signal generated and controlled by a base station, and is intended for use with full duplex, point to multipoint communications networks, particularly low mobility, cellular configurations. Specifically, a pilot tone signal is added to a voice channel transmitted from base station to a mobile station. The voice and pilot tone signals are further modulated using DSSS techniques, which provides a multiple access capability allowing several voice channels to pass through a common RF link. The rate of the spread spectrum code used is much higher than the bandwidth of the voice modulation or the pilot tone signal. The rate of the code is preciously controlled and its length is longer than normally required to spread the voice signal. The extra coding gain is used to recover the narrow bandwidth pilot tone signal at the mobile station.

The pilot tone signal is always active in a control channel or forward link and allows the receive hardware to recover a frequency reference based on the DSSS code rate, which is traceable to a precise frequency reference at the base station. The reference is used to modulate the information channel, to generate the DSSS code, and to synthesize the transmit frequency at the base station. This same frequency reference recovered from the pilot tone signal is used to synthesize the receive tuning, generate the DSSS decoding sequence, and coherently demodulate the voice channel at the mobile station. If an information channel is not active, the control channel pilot is monitored, which allows almost immediate channel lock as the communication switches from control channel to a working information channel. The pilot tone signal establishes precise tuning, code rate and a demodulation reference.

Uniform signal levels from the several mobile stations in a CDMA network is very important for efficient operation of a base station. The amplitude of the forward channel pilot tone signal is used to control the return channel transmit level. Operation assumes similar fade characteristics between the forward and return channels. The invention implements a combined open and closed loop feedback or automatic gain control (AGC) mechanism. The base station sends the pilot tone signal to the mobile station. As the communications link experiences fading, the pilot tone signal varies proportionally in amplitude. The extra processing gain supplied by the DSSS modulator is necessary to precisely observe this level variation. The variation of level is then used to compensate the transmit link under the assumption that if the forward link has experienced a fade, the return link will encounter the same fade and require exactly the amount of transmit power indicated by the pilot tone signal amplitude change. This is open loop compensation and its response is very rapid. In fact, the forward and return links may not match exactly. In this case, the base station sees a compensated signal level from the mobile station. The compensation may be slightly in error. The base station knows the level it wants to see from each mobile station and verniers that level by adjusting the amplitude of the pilot tone signal. This is sensed by the mobile user and a fine transmit level adjustment is made. This is a precise, closed loop compensation and the response time is slightly slower.

The pilot tone signal is always present even when the voice energy is not being transmitted as part of voice activity detection. This allows immediate activation of the voice channel with proper tuning and power level whenever voice activity switches on and off.

BRIEF DESCRIPTION OF THE DRAWINGS

The accompanying drawings, which are incorporated and constitute part of the specification, illustrate the preferred embodiment of the invention, and together with the description serve to explain the principles of the invention.

DETAILED DESCRIPTION OF THE PREFERRED EMBODIMENTS

The present invention assumes a base station that establishes simultaneous communications with a number of mobile stations, with the mobile stations being relatively stationary. The users are multiplexed into forward and return RF channel using CDMA techniques. One control channel and numerous information channels are supported using individual DSSS coding. The channels convey information in a full duplex fashion. In a standby configuration, when no information is being interchanged, only a forward control channel is active.

Figure 1:
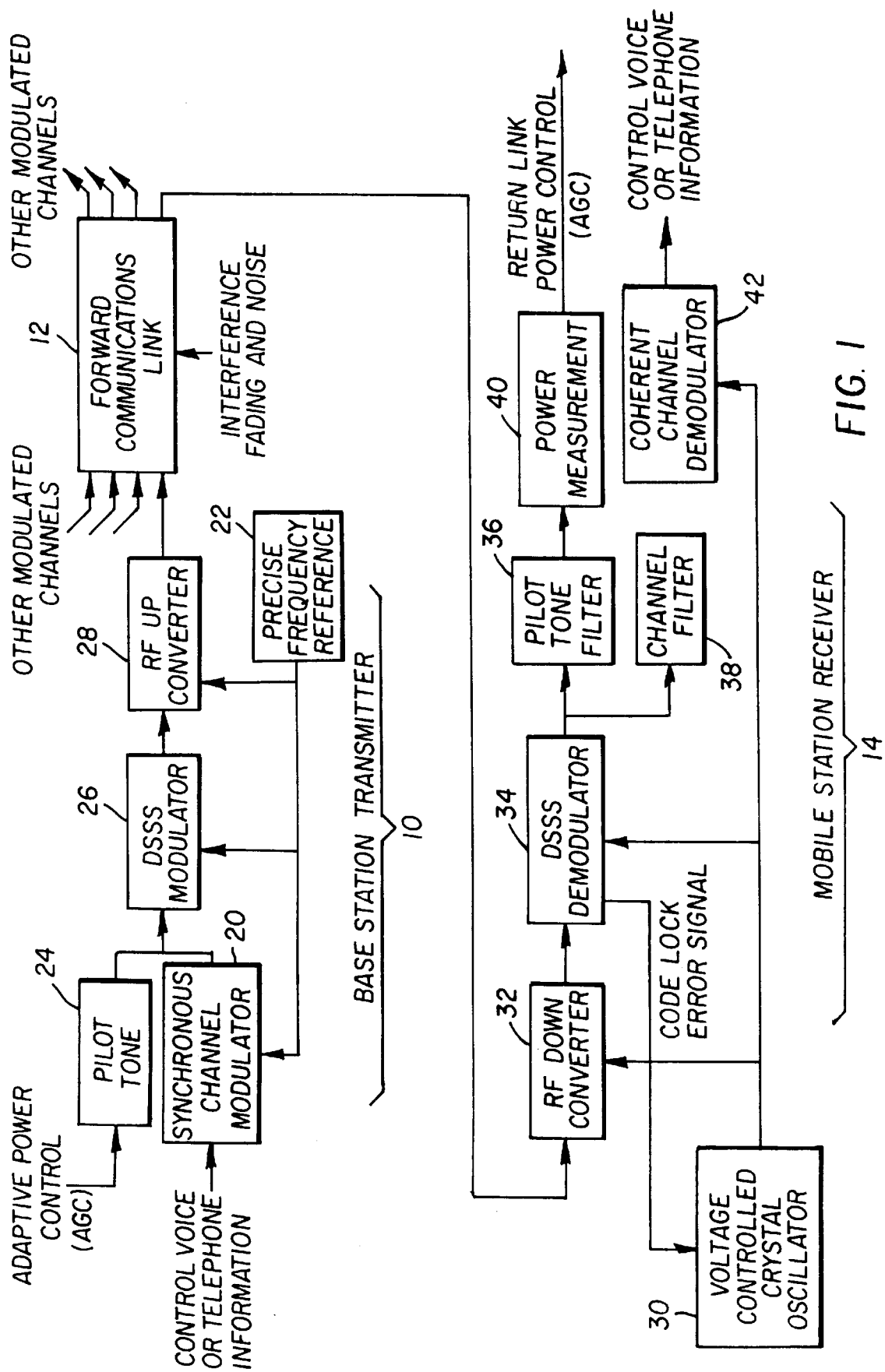
FIG. 1 is a simplified block diagram of a forward link of pilot tone generation and processing functions at a base station and a mobile station respectively.

As shown in FIG. 1, a control channel communication path consists of a base station transmitter 10, a forward communications link 12 and a mobile station receiver 14. The base station transmitter 10 includes a synchronous channel modulator 20, a precise frequency reference generator 22, a pilot tone generator 24, a DSSS modulator 26 and an RF up-converter 28. The mobile station receiver 14 includes a voltage controlled crystal oscillator 30, an RF down-converter 32, a DSSS modulator 34, a pilot tone filter 36, a channel filter 38, a power measurement device 40, and a coherent channel modulator 42.

Figures 2, 3:
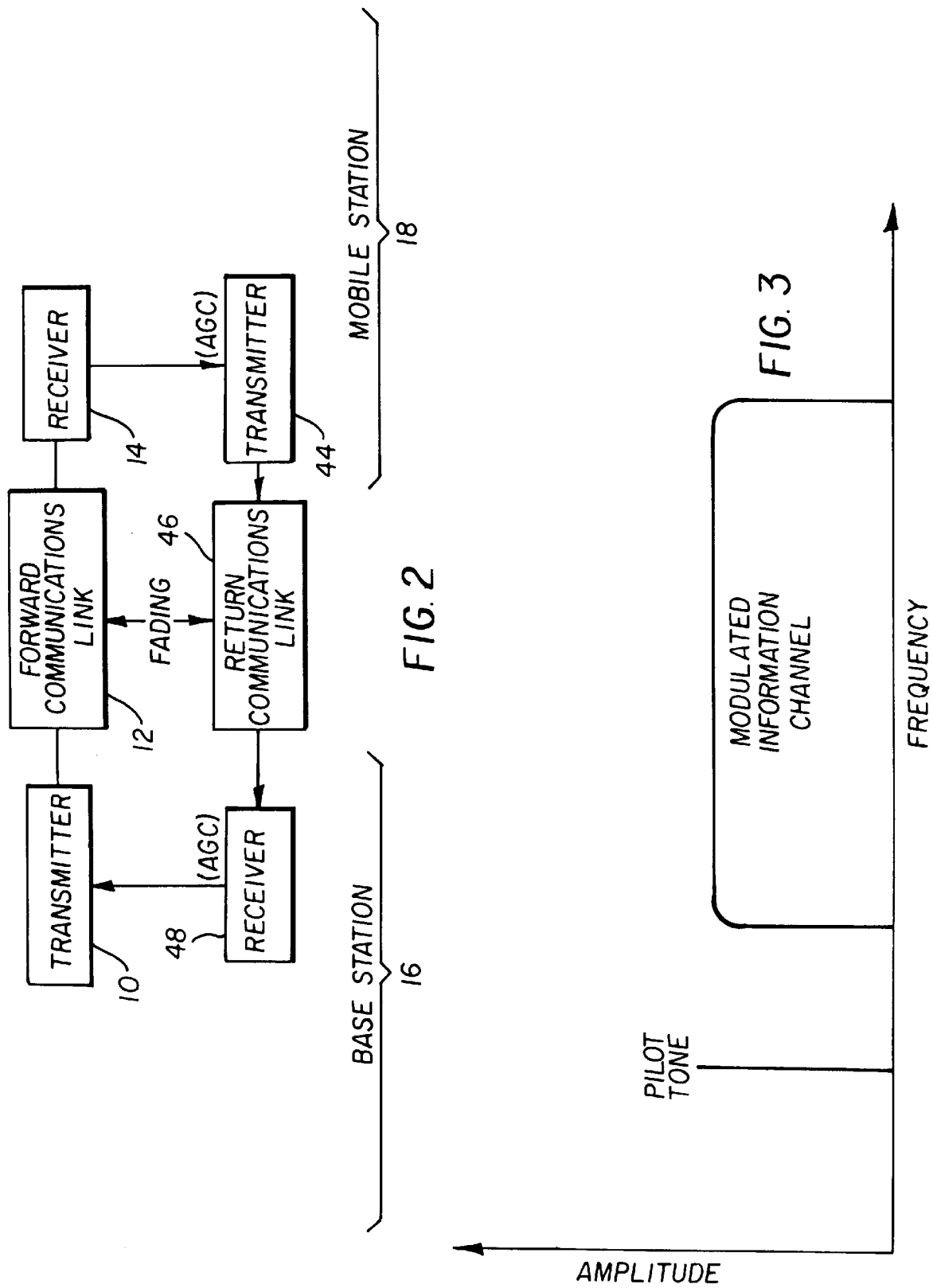
FIG. 2 is a simplified block diagram illustrating an adaptive power control loop established by the pilot tone in a forward channel and a normal return channel.
FIG. 3 is a spectral representation of a voice or telephone channel and the pilot tone as applied to the DSSS modulator and as recovered from the DSSS demodulator.

As information is interchanged in a control channel or working channel, the same forward link structure is used, possibly with different DSSS codes. Additionally, a return link handles the other side of the information path and consists of a mobile station transmitter 44, a return communications link 46 and a base station receiver 48 shown in detail in FIG. 4. FIG. 2 illustrates the combination of full duplex communications paths between a base station 16 and a mobile station 18 using the forward link and return link respectively illustrated in FIGS. 1 and 4.

In operation, control, voice or telephone information is applied to the synchronous channel modulator 20 of the base station transmitter 10. The synchronous channel modulator 20 may be analog or digital, but should implement controlled amplitude, phase modulation including, for example, FM, PM, FSK, PSK, or QAM, all of which generate an IF signal related to a carrier derived from a precision frequency reference signal generated by the precise frequency reference generator 22 local to the base station 16. The synchronous channel modulator 20 may be implemented, for example, as a synchronous BPSK modulator comprising a simple balanced mixer driven by bipolar information bits which modulates the reference derived carrier. Other synchronous modulators, however, may be readily employed.

A pilot tone signal is generated in parallel by the pilot tone generator 24 of the base station transmitter 10. The pilot tone signal is preferably derived from the precision frequency reference signal as well, although this is not absolutely necessary. The amplitude of the pilot tone signal is controlled by an adaptive power control process, as will be described in greater detail. Once the amplitude level is set, all further processing in the base station transmitter 10 and the mobile station receiver 14 operates with fixed gain. The level of the pilot tone signal is therefore significant to the remote mobile station 18 and can be used to signal information. Specifically, the information signaled by the pilot tone signal is the desired power level of the return communications link 46 illustrated in FIG. 2. A greater tone amplitude indicates that the mobile station transmitter 44 should reduce power. A lesser tone power indicates that the mobile station transmitter 44 should increase power. The adaptive power control signal (AGC) is driven by a received power detector located in the base station receiver 48. It indicates the return signal power requirement relative to the desired level for all network mobile stations. This process provides a vernier to the power control process and is intended to handle slight communications path differences, component drift, and nonlinearity.

The modulated information signal and pilot tone signal are combined at IF. A spectral representation is shown in FIG. 3. The relative spectral position is not important. However, the level of the pilot tone signal with respect to the modulated information is important. The level is placed well below the total energy in the information channel. If voice activity techniques are used by the CDMA network, the pilot tone signal maintains full channel lock and synchronization while the voice is absent. If the pilot tone signal is well below voice energy levels, the self noise of the network is reduced and the network can handle a greater number of channels.

The DSSS modulator 26 of the base station transmitter 10 utilizes a fixed gain process that multiples the pilot tone signal and modulated information signal by a uniquely coded waveform. The waveform occupies a frequency bandwidth much wider than the IF signal. The waveform is typically a pseudonoise data stream with values of +1 and −1. Other modulation codes and techniques are available and apply equally well. Multiplication by this waveform essentially BPSK modulates the IF signal to a very wide bandwidth. The true value of the DSSS modulation is rejection of cochannel signals. The DSSS demodulation process leaves cochannel signals with their full bandwidth, noise like structure while it collapses the signal of interest back to its original, narrow IF bandwidth. Filtering exploits this energy distribution difference. The interference is reduced by the ratio of the bandwidth of the DSSS coding bandwidth and the recovered IF bandwidth. It is important to note that the pilot tone signal requires a much smaller bandwidth than the modulated information channel. This implies a much better ability to recover the pilot tone signal in spite of its lower power level. This DSSS modulation process allows communication of several, similar channels in a common transmission band. The process uses sets of codes that correlate with themselves but decorrelate with other codes, which allows several coded channels to pass through the same RF link. At the DSSS demodulation process, the signal with the same code used by that demodulator is converted back to the original FM signal. All others are converted to levels determined by code and information channel modulation cross correlation characteristics. These levels are quite small and result in self interference to the channel of interest. Proper selection of operating characteristics and codes allow operation of many simultaneous channels. In many voice channel applications, the modulated information channel is not generated during speech pauses. This statistically limits the amount of self interference generated and allows operation with more simultaneous channels. A lower level pilot tone signal allows this operation improvement.

The spread information channel and pilot tone signal are feed to the forward communications link 12 by the RF up-converter 28, which utilizes a fixed gain frequency conversion process. Local oscillators derived from the precision frequency reference are used. Frequency multipliers or frequency synthesizers are used to guarantee that the conversion is synchronous to the eventual down conversion process.

The forward communications link 12 contains the signal of interest plus a number of similar channels operating with different DSSS codes. The forward communications link 12 also adds noise and interference, both of which increase the noise in the DSSS demodulation process at the mobile station 18. Finally, the forward communications link 12 experiences fading, which attenuates each signal independently. The fading can be very rapid.

The RF down-converter 32 in the mobile station receiver 14 tunes and filters the incoming signals from the forward communications link 12. The output of the conversion process is at a fixed IF. With a CDMA system, there are no individual frequency channels so a fixed down conversion is possible. The local oscillator is derived from the locally generated reference. It is synthesized exactly as it was at the base station's RF up converter 28. When the reference is recovered at the mobile station 18, the resulting tuning is nearly perfect. The down conversion process operates at fixed gain to allow measurement of pilot tone signal power. In the mobile station receiver 14, the input level may require adjustment to adequately drive the mixer and amplifier chain. Coarse gain changes are available to handle signal blockage, but these require a reciprocal compensation before the pilot tone detector to maintain proper adaptive power control operation. It should be noted that the receiver at the base station 16 operates with a fixed gain because all incoming signals are controlled to exactly the same power levels by the adaptive loops. There is overall power variation depending on activity but operating points must any single signal when all signals are active.

The DSSS demodulator 34 accepts the precisely tuned input at a fixed IF. It removes the effects of the spread spectrum process and reveals the underlying pilot tone and modulated information channel. The demodulator 34 typically consists of a code generator and a multiplier. The code generator generates a sequence identical to the code used to modulate the signal of interest. It also has provision for synchronization of the transmit and receive codes. If the phases of the codes are not synchronized the required signal is not recovered. The synchronization process can be accomplished through serial code search or matched filter techniques. The code synchronous process locks the code generator precisely to the incoming code rate.

In this preferred implementation, the voltage controlled crystal oscillator 30 is precisely locked to the code rate. Since the code rate was generated by the precision oscillator 22 in the base station transmitter 10, a new frequency reference is generated in the remote mobile station 18. This is the basis of the synchronous RF down-converter 32, DSSS demodulator 34 and synchronous demodulator. The DSSS demodulator 34 output generates a replica of the original pilot tone signal and modulated information channel. It also shows the effects of other users in the channel as self noise. The level and characteristics of this self noise vary as a function of the codes used and the number of other users present. In addition, external interference and thermal noise add to the original signal. The interference and noise occupy bandwidths consistent with the codes being used. The recovered modulated information channel occupies a much smaller bandwidth. Addition of a narrow filter adequate to pass this signal increases the ratio of the desired signal to noise as the ratio of the full to reduced bandwidths. A very narrow filter will recover the pilot tone signal with even greater interference and noise immunity.

The pilot tone filter 36 recovers the pilot tone signal with a very narrow bandwidth. The combination of excessive spread spectrum coding and narrow filtering bandwidth result in relatively low noise and interference levels. The extra spread spectrum coding gain allows good pilot tone signal access prior to fully synchronized operation whenever the mobile receiver is initially activated. This initial operating condition can require a wider pilot tone filter bandwidth. Once synchronized to the base station 16, a very narrow pilot tone filter allows greater noise immunity and allows accurate level measurement as part of the power control process. It also maintains the channel whenever voice activity detection turns off the information channel. The minimum pilot tone filter bandwidth is determined by the maximum fade rate of the pilot tone signal. This is a very narrow band process.

The information channel filter 38 has a bandwidth adequate to pass the modulated information channel. The width of this filter determines the noise and interference performance of the information channel.

The power measurement device 40 measures the level of the pilot tone signal and is implemented as a simple energy detector including, for example, diode detectors or square law devices. If the pilot tone signal is generated by the base station reference, it may be detected using a coherent demodulator. The level represents a linear representation of the signal level requested by the base station combined with the fading attenuation of the communications link. This voltage serves as the return link power control and is used to linearly attenuate the power amplifier of the mobile station transmitter 44.

The coherent channel demodulator 42 recovers the channel information from the despread and filtered IF signal. The available reference signal can be used to coherently demodulate the signal. The reference supplies reference frequency and phase allowing absolute phase decoding of the signal. The output of the demodulator 42 is the recovered control, voice or telephone information.

The voltage controlled crystal oscillator (VCXO) 30 is provided to recover the base station reference signal. This is locked to the spread spectrum code rate by the DSSS demodulator 34. Since the mobile station 18 has only limited mobility in the illustrated embodiment, the local reference can be very accurately locked to the base station 16. Such an accurate lock insures precise tuning and long duration maintenance of open loop code lock. The crystal oscillator is required to handle initial acquisition before code lock is complete. Relatively precise tuning is required in order to initially achieve lock.

The adaptive power control loop is elaborated in FIG. 2. The pilot tone signal is generated in the base station 16. Its level is determined by the AGC signal received from the received power detector 50 of the base station receiver 48. The pilot tone signal is spread by the DSSS modulator 26 and proceeds to the RF up-converter 28 for transmission. Both the modulation and transmission processes are fixed gain processes. The spread pilot tone signal passes through the forward communications link 12, where it and the return channel experience highly correlated fading. This attenuates the level of the pilot tone signal. The pilot tone signal reaches the mobile station receiver 14 at the mobile site. It is tuned and then despread by the DSSS demodulator 34 of the mobile station receiver 14, which are also fixed gain processes. The pilot tone signal is now back to its original state except for its amplitude.

The amplitude of the pilot tone signal is changed predominately by the fading of the forward communications link 12. Component variation also causes minor amplitude variation. The power measurement device 40 generates a signal indicative of the amount of attenuation required to bring the return link up to a desired level. The signal serves as an AGC signal driving an attenuator to the mobile station transmitter 44. A large value of pilot tone energy indicates that a large amount of attenuation is required. The relationship is linear. The AGC signal attenuates the return link signal. The return communications link 46 adds fading similar to that experienced in the forward channel. The AGC setting based on pilot tone energy has already accounted for this fade and the signal should arrive at the base station receiver at the correct level, which is verified by the received power measurement device of the base station receiver 48. If the link compensation was exact, the energy measurement will match a desired fixed value. If the return link varied from the forward link or other component values had drifted, an error signal is generated. This AGC signal is used to vernier attenuation of the pilot tone and signal the mobile station transmitter 10 that a finer power adjustment is required. This process only controls the mobile station to base station signal levels to insure equal amplitude. The base station 16 generates all outgoing signals at once so the mobile stations always see all information channel signals at the same power level. As stated the pilot tone levels will vary but their lower power level has little effect on CDMA loading.

Figure 4:
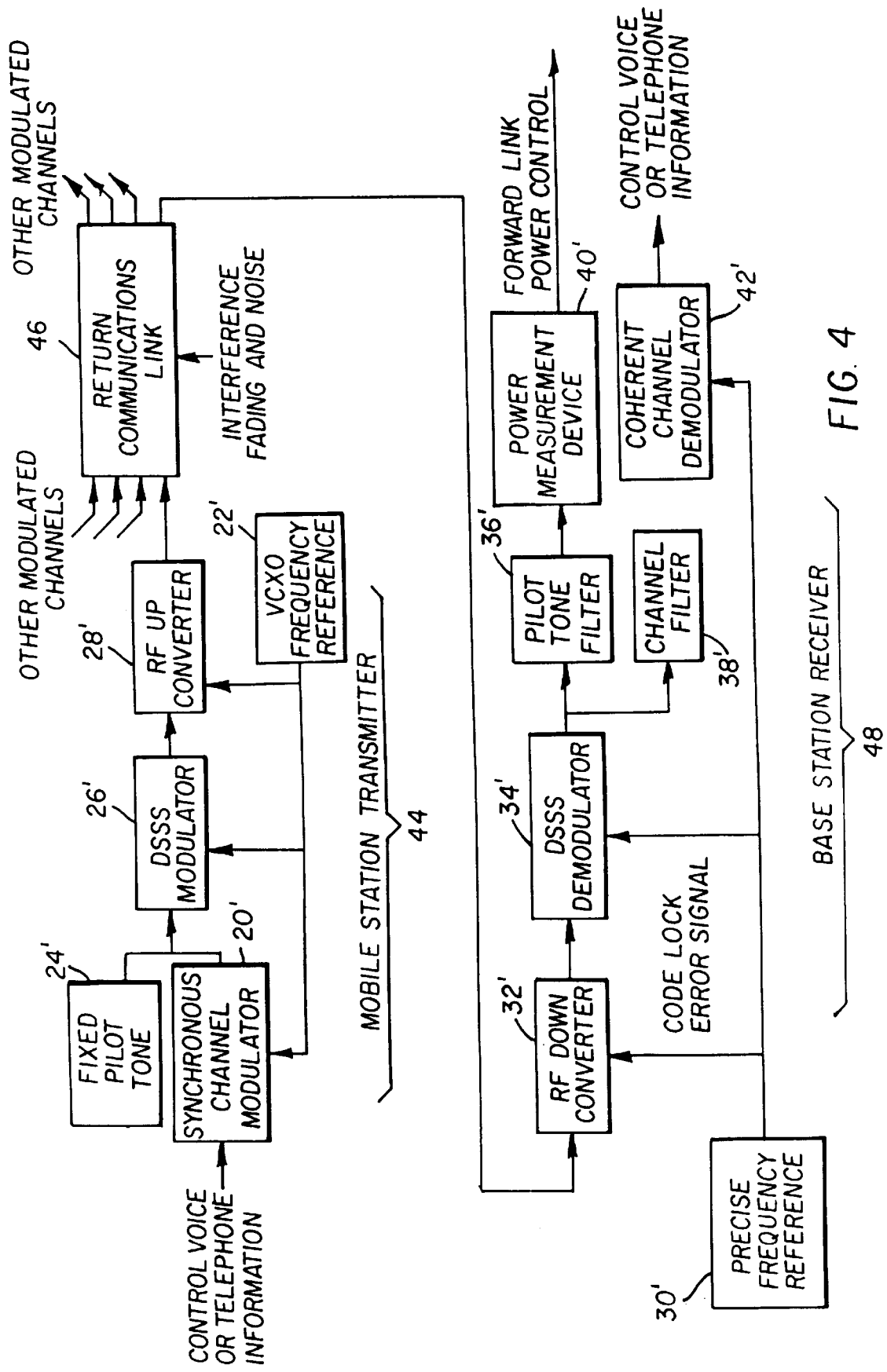
FIG. 4 is a block diagram of a return link of the pilot tone generation and processing functions at the mobile station and remote station respectively.

The return link is shown in detail in FIG. 4. It operates with similar components (which have been indicated with the same reference numerals and a prime notation) as the forward link illustrated in FIG. 1. The functions and implementation are the same as already described. The key differences are the operation of the pilot tone signal and the use of the pilot tone signal derived reference in the mobile station. The pilot tone signal is sent at a fixed level from the mobile station 18 to the base station 16 where it is used to measure power whenever voice activity detection turns the signal modulation off. It is used to drive the adaptive power control loop. The derived reference from the pilot tone signal is used to control up conversion, DSSS modulation and information channel modulation at the mobile station 18. As a result those signals arriving at the base station are now coherent and synchronized to the base station receiver. The previously described processing advantages are also available to the return link.

The invention has been described with reference to certain preferred embodiments thereof. It will be understood, however, that modifications and variations are possible within the scope of the appended claims.

What is claimed is:

1. A communication system comprising:
    a base station including a base station transmitter and a base station receiver, wherein the base station transmitter comprises channel modulation means for receiving a base station input signal and generating a modulated channel signal, pilot tone generation means for generating a pilot tone signal, direct sequence spread spectrum modulation means for receiving the modulated channel signal from the channel modulation means and the pilot tone signal from the pilot tone generation means and direct sequence spread spectrum modulating said modulated channel signal and said pilot tone signal to generate a direct sequence spread spectrum modulated channel signal and a direct sequence spread spectrum modulated pilot tone signal, and means for transmitting the direct sequence spread spectrum modulated channel signal and the direct sequence spread spectrum modulated pilot tone signal; and at least one mobile station including a mobile station receiver and a mobile station transmitter, wherein the mobile station receiver comprises means for receiving the direct sequence spread spectrum modulated channel signal and the direct sequence spread spectrum modulated pilot tone signal from the base station, a direct sequence spread spectrum demodulator for direct sequence spread spectrum demodulating the received direct sequence spread spectrum modulated channel signal and the received direct sequence spread spectrum modulated pilot tone signal to generate a direct sequence spread spectrum demodulated channel signal and a direct sequence spread spectrum demodulated pilot tone signal, and channel demodulation means for generating a recovered signal from the direct sequence spread spectrum demodulated channel signal.

2. A communication system as claimed in claim 1, wherein the mobile station receiver further comprises a power measurement means for measuring a power level of the direct sequence spread spectrum demodulated pilot tone signal and generating a power control signal that is supplied to the mobile station transmitter to normalize return channel transmit levels.

3. A communication system as claimed in claim 1, wherein the base station transmitter further comprises frequency reference generation means for generating a reference signal that is supplied to the channel modulation means and the direct sequence spread spectrum modulation means.

4. A communication system as claimed in claim 3, wherein the pilot tone signal is direct sequence spread spectrum modulated by the direct sequence spread spectrum modulation means with a direct sequence spread spectrum code at a rate of the reference signal.

5. A communication system as claimed in claim 1, wherein the base station transmitter continues to generate and transmit the direct sequence spread spectrum modulated pilot tone signal when the input signal is not present.

6. A communication system as claimed in claim 4, wherein the mobile station receiver further comprises a voltage controlled crystal oscillator that provides a local reference signal to the direct sequence spread spectrum demodulating means and the channel demodulation means.

7. A communication system as claimed in claim 6, wherein the voltage controlled crystal oscillator is locked based on a code lock error signal supplied by the direct sequence spread spectrum demodulating means.

8. A communication system as claimed in claim 1, wherein the mobile station transmitter comprises channel modulation means for receiving a mobile station input signal and generating a modulated channel signal, pilot tone generation means for generating a fixed pilot tone signal, direct sequence spread spectrum modulation means for receiving the modulated channel signal from the channel modulation means and the pilot tone signal from the pilot tone generation means and direct sequence spread spectrum modulating said modulated channel signal and said pilot tone signal to generate a direct sequence spread spectrum modulated channel signal and a direct sequence spread spectrum modulated pilot tone signal, and means for transmitting the direct sequence spread spectrum modulated channel signal and the direct sequence spread spectrum modulated pilot tone signal.

9. A communication system as claimed in claim 1, wherein the base station receiver comprises means for receiving the direct sequence spread spectrum modulated channel signal and the direct sequence spread spectrum modulated pilot tone signal from the mobile station, a direct sequence spread spectrum demodulator for direct sequence spread spectrum demodulating the received direct sequence spread spectrum modulated channel signal and the received direct sequence spread spectrum modulated pilot tone signal to generate a direct sequence spread spectrum demodulated channel signal and a direct sequence spread spectrum demodulated pilot tone signal, and channel demodulation means for generating a recovered signal from the direct sequence spread spectrum demodulated channel signal.

10. A communication system as claimed in claim 9, wherein the base station receiver further comprises a power measurement means for measuring a power level of the direct sequence spread spectrum demodulated pilot tone signal and generating a control signal that is supplied to the pilot tone generation means of the base station transmitter.

* * * * *